United States Patent
Suzuki et al.

(10) Patent No.: US 11,493,690 B2
(45) Date of Patent: Nov. 8, 2022

(54) OPTICAL FIBER LINE, MODULE, AND METHOD FOR MANUFACTURING OPTICAL FIBER LINE

(71) Applicant: SUMITOMO ELECTRIC INDUSTRIES, LTD., Osaka (JP)

(72) Inventors: Masato Suzuki, Osaka (JP); Yoshinori Yamamoto, Osaka (JP); Yoshiaki Tamura, Osaka (JP); Takemi Hasegawa, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/168,468

(22) Filed: Feb. 5, 2021

(65) Prior Publication Data
US 2021/0157053 A1 May 27, 2021

Related U.S. Application Data

(63) Continuation of application No. PCT/JP2019/032700, filed on Aug. 21, 2019.

(30) Foreign Application Priority Data

Aug. 24, 2018 (JP) .............................. JP2018-157023

(51) Int. Cl.
*G02B 6/028* (2006.01)
*G02B 6/036* (2006.01)
(Continued)

(52) U.S. Cl.
CPC .............. *G02B 6/255* (2013.01); *G02B 6/028* (2013.01); *G02B 6/036* (2013.01); *G02B 6/2551* (2013.01); *G02F 1/365* (2013.01)

(58) Field of Classification Search
CPC ........ G02B 6/028; G02B 6/036; G02B 6/255; G02B 6/2551; G02F 1/365
See application file for complete search history.

(56) References Cited

U.S. PATENT DOCUMENTS

| 6,336,749 | B1* | 1/2002 | O'Toole | ............... | G02B 6/2551 |
| | | | | | 385/99 |
| 6,421,484 | B2* | 7/2002 | Tanaka | ............... | H04B 10/2513 |
| | | | | | 385/100 |

(Continued)

FOREIGN PATENT DOCUMENTS

| JP | H08-190030 A | 7/1996 |
| JP | 2002-214467 A | 7/2002 |

(Continued)

OTHER PUBLICATIONS

D. Marcuse, "Loss Analysis of Single-Mode Fiber Splices," The Bell System Technical Journal, vol. 56, No. 5, 1977, p. 703-p. 718.

*Primary Examiner* — Ryan A Lepisto
(74) *Attorney, Agent, or Firm* — Faegre Drinker Biddle & Reath LLP

(57) ABSTRACT

An optical fiber line of one embodiment comprises an HNLF, an SMF, and an MFD transition portion. The MFD transition portion includes end portions of both the HNLF and the SMF facing with a fusion point thereof, and is a section in which an MFD changes such that a difference between a maximum value and a minimum value is 0.3 μm or more for a 100 μm-length. A splicing loss of the HNLF and the SMF at 1,550 nm is one-fifth or less than an ideal butting loss at stationary portions thereof. A total length of the MFD transition portion is 10 mm or less. In a region between one end surface of the HNLF at the fusion point and the other end surface separated from the one end surface by (Continued)

50 μm or more and 300 μm or less, the MFD increases monotonically from the other end surface to the one end surface.

11 Claims, 13 Drawing Sheets

(51) Int. Cl.
  *G02B 6/255* (2006.01)
  *G02F 1/365* (2006.01)

(56) References Cited

U.S. PATENT DOCUMENTS

| | | | |
|---|---|---|---|
| 6,817,784 B2 * | 11/2004 | Nakamura | G02B 6/2551 |
| | | | 385/98 |
| 7,233,727 B2 * | 6/2007 | Hirano | G02B 6/03627 |
| | | | 398/81 |
| 2002/0181885 A1 | 12/2002 | Suzuki et al. | |
| 2005/0041929 A1 | 2/2005 | Suzuki et al. | |
| 2006/0008221 A1 | 1/2006 | Takahashi et al. | |
| 2007/0047962 A1 | 3/2007 | Hirano et al. | |
| 2018/0224607 A1 * | 8/2018 | Bookbinder | C03C 13/046 |

FOREIGN PATENT DOCUMENTS

| | | |
|---|---|---|
| JP | 2006-506686 A | 2/2006 |
| JP | 2006-099147 A | 4/2006 |
| JP | 2006-350265 A | 12/2006 |
| JP | 2007-017907 A | 1/2007 |
| WO | WO-2004/046778 A2 | 6/2004 |
| WO | WO-2018/097256 A1 | 5/2018 |

* cited by examiner

Fig.4

| ITEM | VALUE |
|---|---|
| Aeff [μm$^2$] (1550nm) | 67.45 |
| MFD [μm] (1550nm) | 9.34 |
| MFD [μm] (1310nm) | 8.34 |

Fig.5

| ITEM | VALUE |
|---|---|
| Aeff [μm$^2$] (1550nm) | 15.3 |
| MFD [μm] (1550nm) | 4.5 |
| GeO$_2$ AVERAGE CONCENTRATION OF CORE [ppm] | 160000 |
| F AVERAGE CONCENTRATION OF CORE [ppm] | 0 |
| F AVERAGE CONCENTRATION OF DEPRESSED PORTION [ppm] | 2500 |
| F AREA CONCENTRATION OF DEPRESSED PORTION [ppm·μm$^2$] | $1.6 \times 10^6$ |
| F AVERAGE CONCENTRATION OF CLADDING [ppm] | 0 |
| PARAMETER VALUE TO POWER OF α OF CORE | 1.3 |
| CORE DIAMETER a [μm] | 3.1 |
| MAXIMUM RELATIVE REFRACTIVE INDEX DIFFERENCE OF CORE $\Delta_{core}$ [%] | 1.65 |
| MINIMUM RELATIVE REFRACTIVE INDEX DIFFERENCE OF DEPRESSED PORTION $\Delta_{dep}$ [%] | -0.9 |
| DIAMETER b OF DEPRESSED PORTION [μm] | 7.9 |
| DIAMETER c (GLASS OUTER DIAMETER) OF CLADDING μm | 114.8 |
| CHROMATIC DISPERSION (1550nm) [ps·km$^{-1}$·nm$^{-1}$] | -0.181 |
| NON-LINEAR COEFFICIENT γ [W$^{-1}$km$^{-1}$] | 11 |
| CUTOFF WAVELENGTH [nm] | 1030 |

*Fig.7*

| | SAMPLE | COMPARATIVE EXAMPLE 1 | COMPARATIVE EXAMPLE 2 | COMPARATIVE EXAMPLE 3 |
|---|---|---|---|---|
| SPLICING LOSS AFTER FUSION STEP (BEFORE ADDITIONAL DISCHARGE STEP) [dB] | 0.73 | 0.75 | 0.77 | 0.67 |
| ADDITIONAL DISCHARGE POWER (WITH RESPECT TO MAIN DISCHARGE POWER OF COMPARATIVE EXAMPLE 1)[%] | 65 | NONE | 50 | 75 |
| IDEAL MATCHING LOSS CALCULATED FROM MFD MISMATCHING OF STATIONARY PORTION AT 1,550 nm $\alpha_{ideal}$ [dB] | 2.1 | 2.1 | 2.1 | 2.1 |
| TOTAL ADDITIONAL DISCHARGE TIME UNTIL SPLICING LOSS IN dB NOTATION AT 1,550 nm BECOMES $\alpha_{ideal}/5$ [s] | 200 | NONE | 580 | NONE |
| MINIMUM VALUE OF SPLICING LOSS IN ADDITIONAL DISCHARGE STEP [dB] | 0.24 | NONE | 0.36 | 0.56 |
| TOTAL ADDITIONAL DISCHARGE TIME UNTIL SPLICING LOSS BECOMES MINIMUM VALUE [s] | 500 | NONE | 1000 | 200 |

OPTICAL FIBER LINE, MODULE, AND METHOD FOR MANUFACTURING OPTICAL FIBER LINE

CROSS-REFERENCE TO RELATED APPLICATIONS

This application is a continuation application of PCT/JP2019/032700 claiming the benefit of priority of the Japanese Patent Application No. 2018-157023 filed on Aug. 24, 2018, the entire contents of which are incorporated herein by reference.

TECHNICAL FIELD

The present disclosure relates to an optical fiber line, a module, and a method for manufacturing an optical fiber line.

BACKGROUND ART

Various configurations are known as configurations of optical fiber lines obtained by fusing and splicing end portions of different types of optical fibers.

An optical fiber line described in Patent Document 1 is a line in which a single mode optical fiber having an enlarged effective area and a dispersion compensating optical fiber (DCF) are fusion-spliced. A method for manufacturing an optical fiber line described in Patent Document 1 reduces a splicing loss by heating a fused portion while applying a tension after the fusion and splicing due to discharge.

An optical fiber line described in Patent Document 2 is a line in which a single mode optical fiber (SMF) and a DCF are fusion-spliced. A method for manufacturing an optical fiber line described in Patent Document 2 forms a thermally-diffused expanded core (TEC) by heating a fused location with a flame after the fusion and splicing, and accordingly, reduces a splicing loss.

Optical fiber lines described in Patent Documents 3 and 4 are lines in which short bridge fibers are fusion-spliced while being inserted between an SMF and a DCF.

CITATION LIST

Patent Literature

Patent Document 1: Japanese Patent Application Laid-Open No. 2002-214467
Patent Document 2: Japanese Patent Application Laid-Open No. 2006-506686
Patent Document 3: Japanese Patent Application Laid-Open No. H8-190030
Patent Document 4: Japanese Patent Application Laid-Open No. 2006-99147

Non-Patent Literature

Non-Patent Document 1: D. Marcuse, "Loss Analysis of Single-Mode Fiber Splices", The Bell System Technical Journal, Vol. 56, No. 5, pp. 703-718 1977.

SUMMARY OF INVENTION

An optical fiber line according to an embodiment of the present disclosure comprises a highly non-linear optical fiber (HNLF), a single mode optical fiber (SMF), and an MFD transition portion in which a mode field diameter (MFD) of propagation light along a fiber longitudinal direction changes. The HNLF includes a core, a depressed portion, and a cladding. The depressed portion surrounds the core and has a refractive index lower than a refractive index of the core. The cladding surrounds the depressed portion and has a refractive index lower than the refractive index of the core and higher than the refractive index of the depressed portion. The SMF is fusion-spliced to the HNLF and includes a core and a cladding that surrounds the core and has a refractive index lower than the refractive index of the core. The MFD transition portion is constituted by end portions of both the HNLF and the SMF which are butted while sandwiching a fusion point of the HNLF and the SMF. Further, in the MFD transition portion, an MFD at a use wavelength changes such that a difference between a maximum value and a minimum value is 0.3 µm or more for 100 µm which is a distance along a fiber longitudinal direction (longitudinal direction of the optical fiber line). A splicing loss of the HNLF and the SMF at a wavelength of 1,550 nm is one-fifth or less than an ideal butting loss calculated based on mismatching between MFDs of both the HNLF and the SMF at stationary portions excluding the MFD transition portion at a wavelength of 1,550 nm. A total length of the MFD transition portion which is defined along the fiber longitudinal direction is 10 mm or less. Further, an MFD at the use wavelength increases monotonically to a first surface of the end portion of the HNLF positioned at the fusion point from a second surface separated from the first surface by 50 µm or more and 300 µm or less in a region interposed between the first surface and the second surface.

BRIEF DESCRIPTION OF DRAWINGS

FIG. 4 is a table that summarizes the specifications of the SMF.

FIG. 5 is a table that summarizes the specifications of the HNLF.

FIG. 7 is a table that summarizes a manufacturing condition and a splicing loss of an optical fiber line according to a sample of the present disclosure and a manufacturing condition and a splicing loss of each of optical fiber lines according to Comparative Examples 1 to 3.

DESCRIPTION OF EMBODIMENTS

Figure 1:
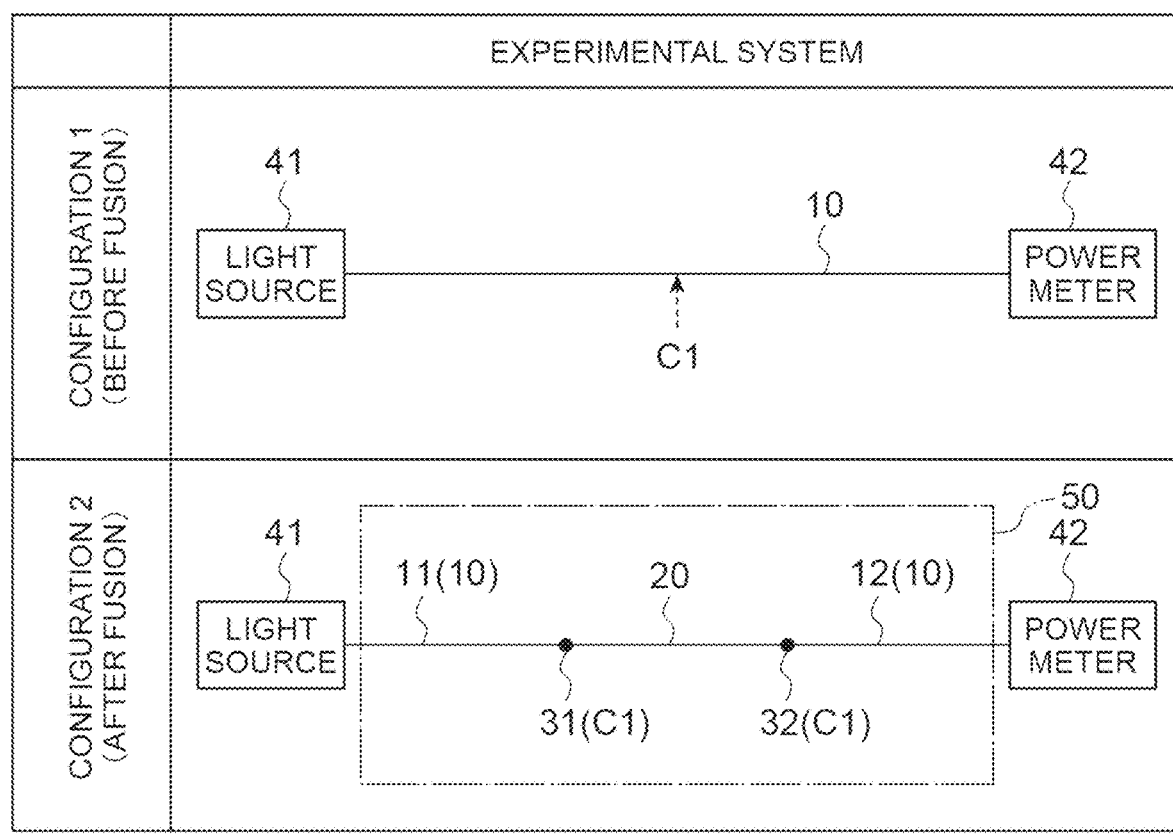
FIG. 1 is a diagram illustrating experimental systems that measure splicing losses of an optical fiber line before and after the fusion and splicing between an HNLF and an SMF.

Problem to be Solved by Present Disclosure

It is preferable that a DCF has a large effective area ($A_{eff}$) in order to suppress non-linearity. In contrast, it is preferable that an HNLF (highly non-linear optical fiber) has a small $A_{eff}$ in order to induce a non-linear effect with high efficiency. Thus, in general, an MFD (mode field diameter) of the HNLF is smaller than an MFD of the DCF. An MFD difference between the HNLF and the SMF is greater than an MFD difference between the DCF and the SMF. Thus, low-loss fusion and splicing of the HNLF and the SMF are difficult.

When a dopant is dispersed by flame heating after the fusion and splicing in order to reduce a splicing loss between the fusion-spliced optical fibers, it is difficult to increase productivity. This is due to a low maximum temperature of the flame. That is, this is because a time required to enlarge the MFD of the optical fiber by dispersing the dopant contained in the optical fiber and a time required to match the MFD between the fusion-spliced optical fibers become long.

On the other hand, compared to the dopant diffusion due to the flame heating, dopant diffusion due to discharge heating can increase the maximum temperature, and thus, a processing time is short and productivity is high. However, in order to reduce a fusion loss, a change in the MFD at the MFD transition portion positioned in a fiber splicing region needs to have a tapered shape (a state in which the MFD changes monotonically along a fiber longitudinal direction, and hereinafter, referred to as an "MFD taper". Compared to the dopant diffusion due to the flame heating, the dopant diffusion due to the discharge heating is difficult to form this MFD taper, and is difficult to reduce the splicing loss.

When the amount of F per unit length (effective area of a portion to which F is added x concentration) (referred to as "fluorine (F) area concentration" in this specification) is small, an effect that the MFD increases due to thermal diffusion of F is limited. Since Ge contained in a core has a slower diffusion rate than F, it takes time to reduce the fusion loss. The core and a cladding are substantially free from dopants for lowering a refractive index (refractive index reducer), and when the amount of F contained in a depressed portion is limited, it takes time to reduce the splicing loss.

When a short bridge fiber is inserted between the optical fibers to be spliced, since it is effective in lowering the splicing loss but one more fusion splicing location is added, productivity deteriorates.

The present disclosure provides an optical fiber line having a structure in which an HNLF and an SMF are fusion-spliced to each other, and an optical fiber line capable of being manufactured with a low splicing loss and high productivity. Further, the present disclosure also provides a method capable of manufacturing such an optical fiber line.

Effects of Present Disclosure

The optical fiber line of the present disclosure has a structure in which the HNLF and the SMF are fusion-spliced to each other, and can be manufactured with a low splicing loss and high productivity.

DESCRIPTION OF EMBODIMENT OF PRESENT DISCLOSURE

First, contents of an embodiment of the present disclosure will be individually listed and described.

(1) As an aspect, an optical fiber line according to an embodiment of the present disclosure comprises a highly non-linear optical fiber (HNLF), a single mode optical fiber (SMF), and an MFD transition portion. The HNLF includes a core, a depressed portion, and a cladding. The depressed portion surrounds the core and has a refractive index lower than a refractive index of the core. The cladding surrounds the depressed portion and has a refractive index lower than the refractive index of the core and higher than the refractive index of the depressed portion. The SMF is fusion-spliced to the HNLF and includes a core and a cladding that surrounds the core and has a refractive index lower than the refractive index of the core. The MFD transition portion is constituted by end portions of both the HNLF and the SMF which are butted while sandwiching a fusion point of the HNLF and the SMF. Further, in the MFD transition portion, an MFD at a use wavelength changes such that a difference between a maximum value and a minimum value is 0.3 μm or more for 100 μm which is a distance along a fiber longitudinal direction (longitudinal direction of the optical fiber line). A splicing loss of the HNLF and the SMF at a wavelength of 1,550 nm is one-fifth or less than an ideal butting loss calculated based on mismatching between MFDs of both the HNLF and the SMF at stationary portions excluding the MFD transition portion at a wavelength of 1,550 nm. A total length of the MFD transition portion which is defined along the fiber longitudinal direction is 10 mm or less. Further, an MFD at the use wavelength increases monotonically to a first surface of the end portion of the HNLF positioned at the fusion point from a second surface separated from the first surface by 50 μm or more and 300 μm or less in a region interposed between the first surface and the second surface.

Note that, in the present disclosure, the "highly non-linear optical fiber (HNLF)" means an optical fiber having a non-linear coefficient of 7 $W^{-1} \cdot km^{-1}$ or more and an effective area ($A_{eff}$) of 30 $\mu m^2$ or less at a wavelength of 1,550 nm. The "stationary portion" is the section in which the difference between the maximum value and the minimum value of an MFD at the use wavelength is less than 0.3 μm for 100 μm which is the distance along the fiber longitudinal direction, and the "MFD transition portion" is the section in which the MFD changes at the use wavelength such that the difference between the maximum value and the minimum value is 0.3 μm or more for a distance of 100 μm. The "concentration" of the dopant is expressed as a mass fraction (a ratio of a mass of an object to a total mass). Further, an "ideal butting loss $\alpha_{ideal}$ [dB]" is a loss derived only from the MFD mismatching at the wavelength of 1,550 nm of each of two optical fibers sandwiching the fusion point, and is expressed by the following Equation (1) by using a value $W_{12}$ obtained by dividing the MFD at the wavelength of 1,550 nm in a reference waveguide mode at the stationary portion of one optical fiber by the MFD at the wavelength of 1,550 nm in a reference waveguide mode at the stationary portion of the other optical fiber (see Non-Patent Document 1 described above).

$$\alpha_{ideal} = -10 \, \mathrm{Log}_{10}\{4W_{12}^2/(W_{12}^2+1)^2\} \quad (1)$$

(2) As an aspect of the present disclosure, the HNLF is comprised of silica glass. Further, at the stationary portion of the HNLF, the core is substantially free from a refractive index reducer as a dopant that lowers a glass refractive index at the wavelength of 1,550 nm and contains a refractive index increaser as a dopant that raises the glass refractive index at the wavelength of 1,550 nm. The depressed portion is substantially free from the refractive index increaser and contains the refractive index reducer. The cladding is substantially free from the refractive index reducer. Note that, even when the dopant for lowering the refractive index is substantially contained only in the depressed portion, the HNLF and the SMF can be efficiently fusion-spliced with a low loss. Here, the "is substantially free from the dopant" means that a mass fraction of the dopant is less than 100 ppm. Within this range, each dopant does not cause a change in refractive index that can affect optical characteristics of the optical fiber.

(3) As an aspect of the present disclosure, it is preferable that the core contains $GeO_2$ as the refractive index increaser at the stationary portion of the HNLF. It is preferable that the depressed portion contains fluorine having an area concentration of $0.4 \times 10^6$ ppm·μm$^2$ or more and $3.2 \times 10^6$ ppm·μm$^2$ or less as the refractive index reducer. In this case, even when the area concentration of F which is the dopant for lowering the refractive index contained in the depressed portion is a limited amount, the HNLF and the SMF can be efficiently fusion-spliced with a low loss.

(4) As an aspect of the present disclosure, it is preferable that an outer diameter of the cladding of the HNLF decreases or increases monotonically from the stationary portion of the HNLF to the stationary portion of the SMF at the end portion of the HNLF. In this case, since there is no recess on a front surface of the cladding, mechanical strength can be ensured.

(5) As an aspect of the present disclosure, the total length of the MFD transition portion may be 2 mm or less. Further, a length of a portion constituting a part of the HNLF of the MFD transition portion which is defined along the fiber longitudinal direction may be 1.5 mm or less. In this case, the amount of heat required to form the MFD transition portion can be reduced, and thus, low-loss splicing can be efficiently performed.

(6) As an aspect of the present disclosure, it is preferable that the SMF is an optical fiber compliant with G.657.A1 of ITU-T. The optical fiber compliant with G657.A1 is more resistant to bending than a general-purpose SMF, and thus, the optical fiber can be housed in a module with a small radius (a module volume can be reduced).

(7) As an aspect of the present disclosure, it is preferable that an outer diameter of the core is 2.5 μm or more and 4.0 μm or less at the stationary portion of the HNLF. It is preferable that an outer diameter ratio of the depressed portion to the core is 1.8 or more and is 3.2 or less. It is preferable that a relative refractive index difference of a maximum refractive index of the core to an average refractive index of the cladding is 1.3% or more and 2.0% or less. It is preferable that a relative refractive index difference of a minimum refractive index of the depressed portion to the average refractive index of the cladding is −1.0% or more and −0.5% or less. Furthermore, it is preferable that the stationary portion of the HNLF has an $A_{eff}$ of 10 μm$^2$ or more and 30 μm$^2$ or less at the wavelength of 1,550 nm, an MFD of 3.5 μm or more and 5.0 μm or less at the wavelength of 1,550 nm, a chromatic dispersion of −3.0 ps·km$^{-1}$·nm$^{-1}$ or more and 1.5 ps·km$^{-1}$·nm$^{-1}$ or less at the wavelength of 1,550 nm, and a non-linear coefficient of 7 W$^{-1}$·km$^{-1}$ or more and 20 W$^{-1}$·km$^{-1}$ or less at the wavelength of 1,550 nm. In this case, since the chromatic dispersion has flat optical characteristics in a C band, phase matching of a non-linear phenomenon can be taken in a wide band in the C band.

(8) As an aspect of the present disclosure, it is preferable that in the region included in the end portion of the HNLF (region interposed between the first surface and the second surface separated from the first surface by 50 μm), a ratio $(v_F/v_G)$ of a diffusion rate $v_F$ of fluorine to a diffusion rate $v_G$ of $GeO_2$ is 22 or more and 40 or less. Deformation (recess) of the MFD transition portion can be avoided without melting the fused portion including the fusion point of the HNLF and the SMF.

(9) As an aspect of the present disclosure, it is preferable that a butting region constituted by the end portion of the HNLF and the end portion of the SMF and including the fusion point, is protected by being coated with resin or housed in a reinforcing sleeve. Here, it is preferable that the butting region protected by the resin or the reinforcing sleeve has a strength of 200 kpsi (=1.4 MPa) or more. This configuration is effective in preventing breakage during high-power light transmission (for example, 1 W or more).

(10) As an aspect of the present disclosure, both or one of the HNLF and the SMF may have a coating resin layer surrounding the cladding and containing a colorant. In particular, in a configuration in which both the HNLF and the SMF have the coating resin layer, the coating resin layers of the HNLF and the SMF may include colorants of different colors, respectively. In this case, erroneous splicing between the SMFs and fusion between the HNLFs can be prevented. Further, it is easy to visually inspect these fibers when these fibers are housed in the module.

(11) As an aspect of the present disclosure, it is preferable that a 50% breaking strength in a tensile strength test is 4.5 N or more.

(12) A module according to an embodiment of the present disclosure includes the optical fiber line having the aforementioned structure (an optical fiber line according to an embodiment of the present disclosure), and a metal housing configured to house the optical fiber line. According to this configuration, an external damage of the optical fiber due to impact or heat from an outside during actual use can be prevented. Further, the heat generated at the splicing portion of the optical fibers can be efficiently released to the outside.

(13) A method for manufacturing an optical fiber line according to an embodiment of the present disclosure includes an arrangement step, a fusion step, and an additional discharge step. In the arrangement step, an end portion of one of an HNLF and an SMF is arranged so as to face an end portion of the other thereof in a state in which the end portions match. Here, the HNLF includes a core, a depressed portion, and a cladding. The depressed portion surrounds the core and has a refractive index lower than a refractive index of the core. The cladding surrounds the depressed portion and has a refractive index lower than the refractive index of the core and higher than the refractive index of the depressed portion. The fusion step is performed after the arrangement step. In this fusion step, the matching end portions of the HNLF and the SMF are melted by heating. Accordingly, the end portions of the HNLF and the SMF are fused. The additional discharge step is performed after the fusion step.

In this additional discharge step, a region positioned close to the HNLF from a fusion point of the HNLF and the SMF is reheated by discharge. An optical fiber line having the above-mentioned structure (the optical fiber line according to the embodiment of the present disclosure) is obtained by this additional discharge step.

(14) As an aspect of the present disclosure, it is preferable that, in the additional discharge step, the region positioned close to the HNLF from the fusion point is reheated for 50 seconds or more with a discharge power that disperses fluorine contained in the HNLF without melting the cladding of the HNLF. The HNLF is heated at a temperature at which the cladding of the HNLF is not melted, an increase in fusion loss due to the deformation of the cladding can be effectively avoided.

(15) As an aspect of the present disclosure, it is preferable that, in the additional discharge step, the reheating due to the discharge is performed while moving a heated portion relative to the fusion-spliced end portion of the HNLF and end portion of the SMF. According to this configuration, even though a heating range is dopant diffusion by local discharge heating, a wide range can be substantially heated.

(16) As an aspect of the present disclosure, it is preferable that, in the additional discharge step, the reheating due to the discharge is performed in a range (the end portion of the HNLF) in which a length along a fiber longitudinal direction is 1 times or more than an outer diameter of the cladding. According to this configuration, the discharge can be performed in the wide range by widening a distance between discharge electrode rods or setting the discharge electrode rods to be thicker. Accordingly, a time required for additional discharge can be shortened.

As described above, each of the aspects listed in the [Description of Embodiments of the Present Disclosure] is applicable to each of all the remaining aspects or all combinations of these remaining aspects.

DETAILS OF EMBODIMENT OF PRESENT DISCLOSURE

Hereinafter, specific structures of an optical fiber line, a module, and a method for manufacturing an optical fiber line according to an embodiment of the present disclosure will be described in detail with reference to the accompanying drawings. Note that, the present invention is not limited to these examples, but is defined by the scope of the claims. The present invention is intended to include meanings equivalent to the scope of the claims and all modification examples within the scope. Further, in a description of the drawings, the same components are denoted by the same reference numerals, and a redundant description will be omitted.

The optical fiber line of the present embodiment has a configuration in which a highly non-linear optical fiber (HNLF) and an SMF are fusion-spliced to each other. FIG. 1 is a diagram illustrating experimental systems that measure splicing losses of an optical fiber line before and after fusion splicing between the HNLF and the SMF.

Configuration 1 (before fusion) of FIG. 1 illustrates an experimental system for measuring a reference power. In the experimental system of Configuration 1, light having a wavelength of 1,550 nm outputted from a laser diode (LD) light source 41 is incident on an incident end of a single mode optical fiber (SMF) 10. Light emitted from an emission end of the SMF 10 is received by an optical power meter 42 after being guided through the SMF 10, and thus, a received light power (reference power) is detected. Note that, in Configuration 1 of FIG. 1, a position indicated by an arrow Cl is a cutting position of the SMF 10 that is cut after the reference power is measured.

Subsequently, the SMF 10 is cut at the position indicated by the arrow Cl, and thus, the SMF 10 is divided into an SMF 11 and an SMF 12. A highly non-linear optical fiber (HNLF) 20 is inserted between the SMF 11 and the SMF 12, one end of the HNLF 20 and an end portion of the SMF 11 are fusion-spliced at a fusion point 31, and the other end of the HNLF 20 and an end portion of the SMF 12 are fusion-spliced at a fusion point 32. Configuration 2 (after fusion) of FIG. 1 is obtained through such cutting and fusion steps. In an experimental system of Configuration 2, light having a wavelength of 1,550 nm outputted from the LD light source 41 is incident on an incident end of the SMF 11. Light emitted from an emission end of the SMF 12 after being guided through the SMF 11, the HNLF 20, and the SMF 12 in this order is received by the optical power meter 42 (the received light power is detected). Note that, as illustrated in Configuration 2, an HNLF module is constituted by housing an optical fiber line including the SMF 11, the HNLF 20, and the SMF 12 in a metal housing 50.

Figure 2:
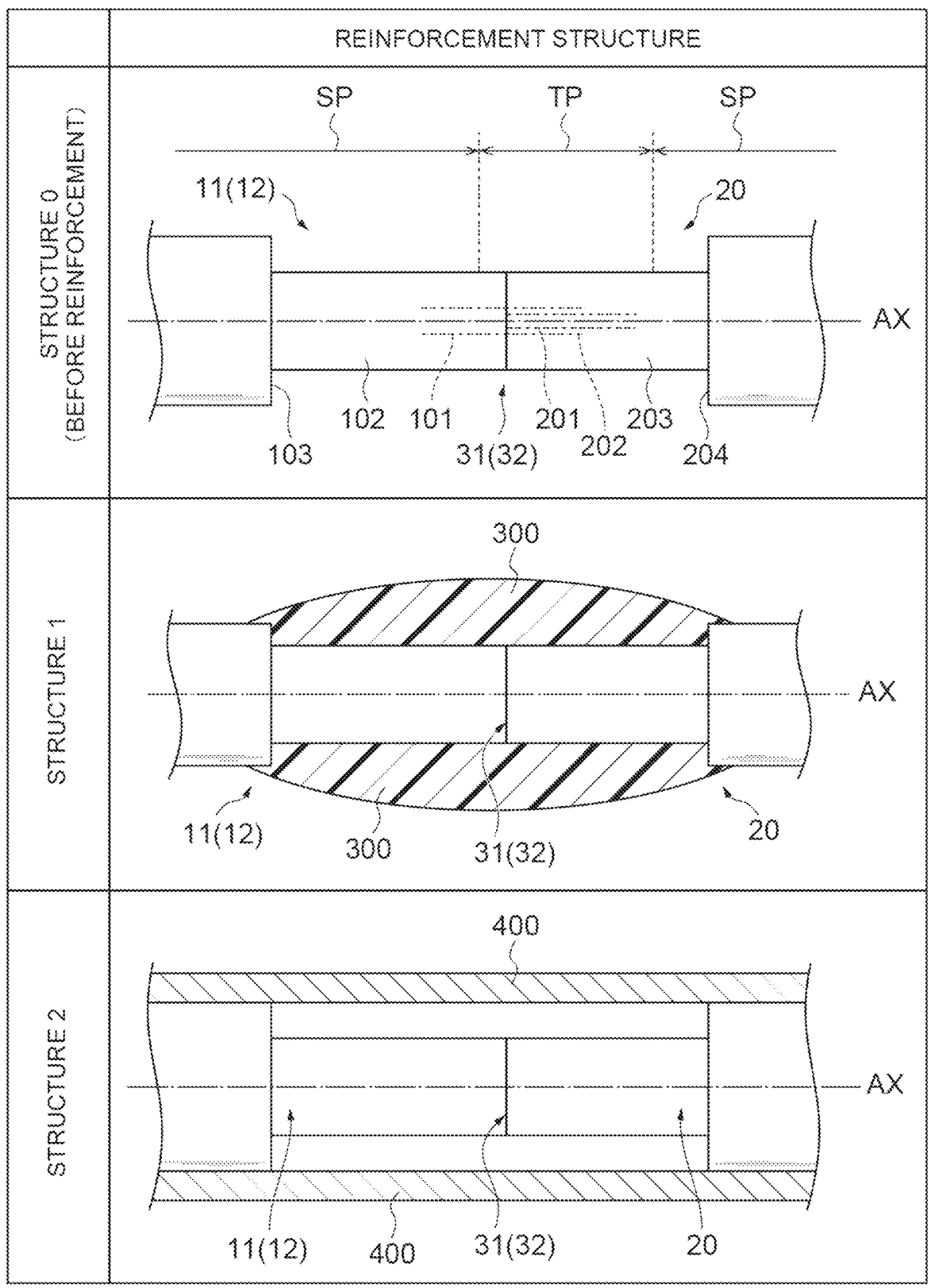
FIG. 2 is a diagram illustrating an example of a reinforcement structure at a fusion point between the HNLF and the SMF.

FIG. 2 is a diagram illustrating an example of a reinforcement structure at the fusion points of the HNLF and the SMFs. Specifically, FIG. 2 is a diagram illustrating the example of the reinforcement structure of the fusion point 31 of the SMF 11 and the HNLF 20 and the fusion point 32 of the HNLF 20 and the SMF 12.

Structure 0 of FIG. 2 is a state before reinforcement (a state before an MFD transition portion is formed), specifically, indicates a state in which one end portion of the SMF 11 and one end portion of the HNLF 20 are fusion-spliced along a central axis AX or a state in which the other end portion of the HNLF 20 and one end portion of the SMF 12 are fusion-spliced along the central axis AX. Note that, since the splicing structure of the SMF 11 and the HNLF 20 and the splicing structure of the HNLF 20 and the SMF 12 are substantially the same, only a splicing relationship between the HNLF 20 and the SMF 11 will be described below.

The SMF 10 is an optical fiber compliant with G.657.A1 of ITU-T, and the SMF 11 and the SMF 12 divided from the SMF 10 are also optical fibers compliant with the G.657.A1 standard. The SMF 11 (SMF 12) is comprised of silica glass and includes a core 101 extending along the central axis AX, a cladding 102 surrounding the core 101, and a coating resin layer 103 surrounding the cladding 102. A refractive index of the cladding 102 is lower than a refractive index (maximum refractive index) of the core 101. A part of the coating resin layer 103 is removed at the end portion of each of the SMF 11 and the SMF 12 so as to be fusion-spliced to the HNLF 20.

On the other hand, the HNLF 20 is comprised of silica glass and has a core 201 extending along the central axis AX, a depressed portion 202 surrounding the core 201, a cladding 203 surrounding the depressed portion 202, and a coating resin layer 204 surrounding the cladding 203. A refractive index of the depressed portion 202 is lower than a refractive index (maximum refractive index) of the core 201. A refractive index of the cladding 203 is lower than the refractive index of the core 201 (maximum refractive index) and is higher than the refractive index of the depressed portion 202 (minimum refractive index). A part of the coating resin layer 204 is removed at both end portions of the HNLF 20 so as to be fusion-spliced to each of the SMF 11 and the SMF 12.

Note that, although the coating resin layers 204 and 103 are provided at both the HNLF 20 and the SMF 11 (SMF 12) in the example of FIG. 2, the coating resin layer may be provided at only one thereof. It is preferable that the coating resin layer 204 and the coating resin layer 103 contain a colorant, and it is preferable that the coating resin layer 204 and the coating resin layer 103 preferably contain colorants of different colors in the configuration in which the coating resin layers 204 and 103 are provided at both the HNLF 20 and the SMF 11 (SMF 12).

Regions SP illustrated in Structure 0 of FIG. 2 indicate a stationary portion of the SMF 11 (SMF 12) and a stationary portion of the HNLF 20. In particular, the stationary portion SP of the HNLF 20 has a W-type refractive index profile illustrated in FIG. 3. On the other hand, a region TP illustrated in Structure 0 of FIG. 2 indicates a region (MFD taper forming region) to be the MFD transition portion. Substantially, the region TP coincides with a region indicating an MFD transition portion at which an MFD taper is formed.

The MFD transition portion is formed in the region TP by reheating a region (a region included in the region TP) positioned close to the HNLF 20 from the fusion point 31 (32) of the HNLF 20 and the SMF 11 (SMF 12) by discharge. Note that, it is preferable that the reheating due to the discharge is performed with a discharge power that disperses F (fluorine) contained in the HNLF 20 for 50 seconds or more without melting the cladding 203 of the HNLF 20. Further, it is preferable that the reheating due to the discharge is performed while moving a heated portion relative to the end portions of the HNLF 20 and the SMF 11 (SMF 12). It is preferable that a length of a region to be reheated along a fiber longitudinal direction is 1 times or more than an outer diameter of the cladding 203.

As described above, the MFD transition portion formed in the region TP is constituted by both the end portions of the HNLF 20 and the SMF 11 (SMF 12) which match each other with the fusion point 31 (32) of the HNLF 20 and the SMF 11 (SMF 12) interposed therebetween. Further, in a region interposed between a first surface (abutment surface of the HNLF 20 and the SMF 11 (SMF 12)) positioned at the fusion point 31 (32) of the end portion of the HNLF 20 and a second surface separated from the first surface by 50 μm or more and 300 μm or less, an MFD at a use wavelength increases monotonically from the second surface to the first surface (MFD taper).

The MFD transition portion is defined as a section in which the MFD at the use wavelength changes such that a difference between a maximum value and a minimum value is 0.3 μm or more for 100 μm which is a distance along the fiber longitudinal direction (coinciding with the central axis AX). A total length of the MFD transition portion along the fiber longitudinal direction is 10 mm or less, preferably 2 mm or less. Note that, in the configuration in which the total length of the MFD transition portion is 2 mm or less, it is preferable that a length of a portion of the MFD transition portion constituting a part of the HNLF 20 which is defined along the fiber longitudinal direction is 1.5 mm or less. Further, due to the MFD transition portion formed as described above, a splicing loss of the HNLF 20 and the SMF 11 (SMF 12) at a wavelength of 1,550 nm is equal to or less than one-fifth of an ideal butting loss calculated based on mismatching between MFDs at a wavelength of 1,550 nm in both the stationary portions SP of the HNLF 20 and the SMF 11 (SMF 12). Although an example in which the outer diameter of the cladding 203 in the HNLF 20 is constant is illustrated in Structure 0 of FIG. 2, the outer diameter of the cladding 203 at this end portion may monotonically decrease or increase from the stationary portion SP of the HNLF 20 to the stationary portion SP of the SMF 11 (SMF 12).

In Structure 1 of FIG. 2, the MFD transition portion is formed in a butting region which is constituted by the end portion of the HNLF 20 and the end portion of the SMF 11 (SMF 12) and includes the fusion point 31 (32). This butting region is coated with a recoating resin 300, and thus, the vicinity of the fusion point of the optical fiber line is protected. On the other hand, in Structure 2 of FIG. 2, the butting region is housed in a reinforcing sleeve 400. In either structure, the butting region protected by the recoating resin 300 or the reinforcing sleeve 400 has a strength of 200 kpsi or more.

Figure 3:
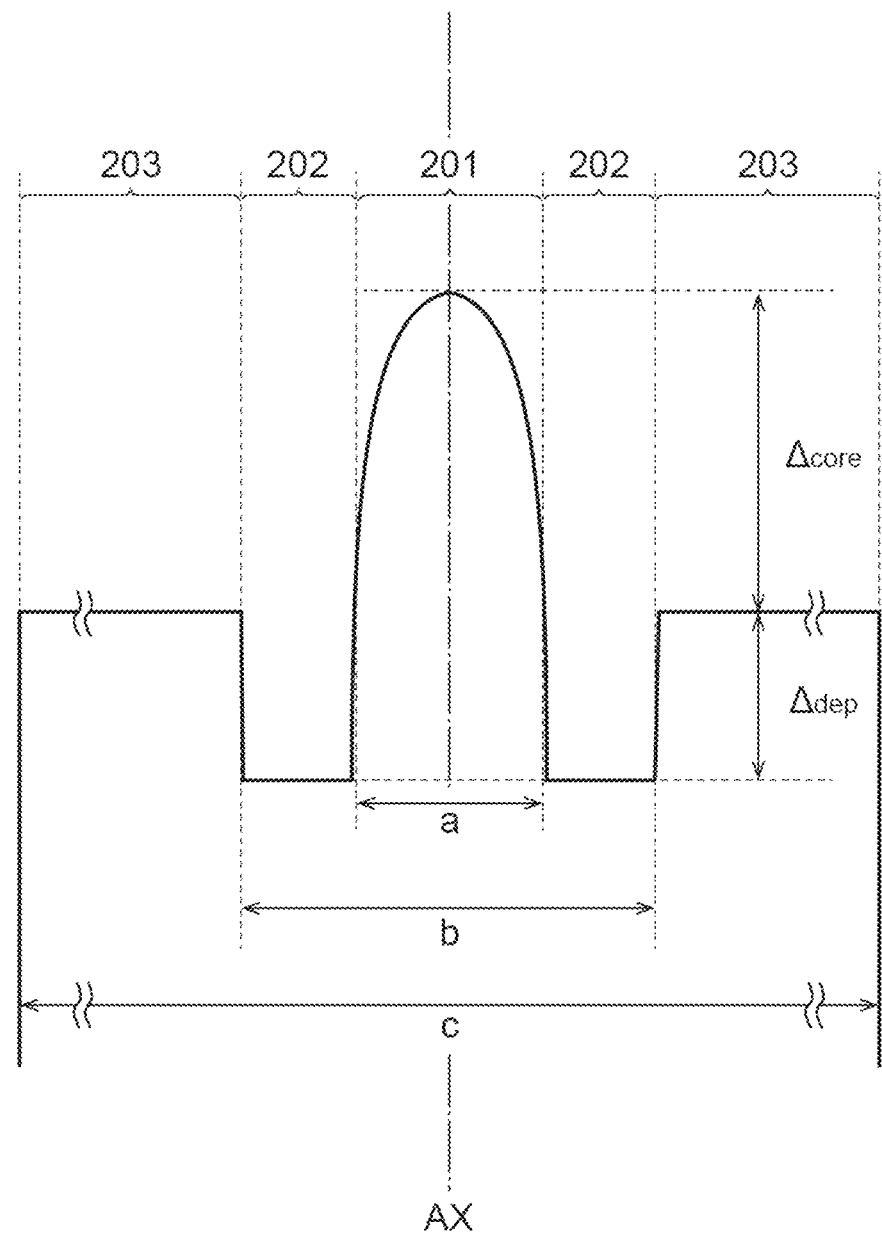
FIG. 3 is a diagram illustrating a refractive index profile of the HNLF (stationary portion).

FIG. 3 is a diagram illustrating a refractive index profile of the HNLF 20 (particularly, the stationary portion SP). The HNLF 20 has a W-type refractive index profile. That is, the stationary portion SP of the HNLF 20 includes the core 201 (outer diameter a), the depressed portion 202 (outer diameter b) surrounding the core 201, the cladding 203 (outer diameter c) surrounding the depressed portion 202, and the coating resin layer 204 surrounding the cladding 203. The depressed portion 202 has the refractive index lower than the refractive index of the core 201. The cladding 203 has the refractive index lower than the refractive index of the core 201 and higher than the refractive index of the depressed portion 202. Typically, the HNLF 20 has a non-linear coefficient γ of 7 $W^{-1} \cdot km^{-1}$ or more at a wavelength of 1,550 nm, and an $A_{eff}$ at a wavelength of 1,550 nm is 30 μm$^2$ or less.

The SMF 10 (substantially the SMF 11 or 12) and the HNLF 20 are comprised of silica glass. In both the HNLF 20 and the SMF 11 (SMF 12), the stationary portion SP is defined as a section in which the change of the MFD at the use wavelength is limited such that the difference between the maximum value and the minimum value is less than 0.3 μm for 100 μm which is the distance along the fiber longitudinal direction. In particular, in the stationary portion SP of the HNLF 20, the core 201 is substantially free from a dopant (refractive index reducer) that lowers a glass refractive index at a wavelength of 1,550 nm, and includes, for example, $GeO_2$ as a dopant that raises the glass refractive index at a wavelength of 1,550 nm (refractive index increaser). On the other hand, the depressed portion 202 is substantially free from the refractive index increaser, and contains, for example, fluorine having an area concentration of $0.4 \times 10^6$ ppm·μm$^2$ or more and $3.2 \times 10^6$ ppm·μm$^2$ or less as the refractive index reducer. Note that, the cladding 203 is substantially free from the refractive index reducer.

A suitable range of characteristics of the HNLF 20 is as follows. The outer diameter a of the core 201 is twice a distance from a center of the HNLF 20 (central axis AX) to a first position at which a derivative value of the refractive index profile is minimized. The outer diameter b of the depressed portion 202 is twice a distance from the center of the HNLF 20 to a second position at which a derivative value of the refractive index profile is maximized in a region in which the distance from the center of the HNLF 20 is larger than a/2. Specifically, the outer diameter a of the core 201 is 2.5 μm or more and 4.0 μm or less. An outer diameter ratio (b/a) of the depressed portion 202 to the core 201 is 1.8 or more and 3.2 or less. A relative refractive index difference $\Delta_{core}$ of the maximum refractive index of the core 201 to an average refractive index of the cladding 203 is 1.3% or more and 2.0% or less. A relative refractive index difference $\Delta_{dep}$ of the minimum refractive index of the depressed portion 202 to the average refractive index of the cladding 203 is −1.0% or more and −0.5% or less. The $A_{eff}$ at a wavelength of 1,550 nm is 10 μm$^2$ or more and 30 μm$^2$ or less. The MFD at a wavelength of 1,550 nm is 3.5 μm or more and 5.0 μm or less. A chromatic dispersion at a wavelength of 1,550 nm is −3.0 ps·km$^{-1}$·nm$^{-1}$ or more and 1.5 ps·km$^{-1}$·nm$^{-1}$ or less. The non-linear coefficient γ at a wavelength of 1,550 nm is 7 W$^{-1}$·km$^{-1}$ or more and 20 W$^{-1}$·km$^{-1}$ or less.

Note that, FIG. 4 is a table that summarizes the specifications of the SMF 10 (substantially the SMF 11 and the SMF 12) applied to experiments to be described later. The SMF 10 is an optical fiber compliant with G.657.A1 of ITU-T. FIG. 5 is a table that summarizes the specifications of the HNLF 20 applied to experiments to be described later.

Figure 6:
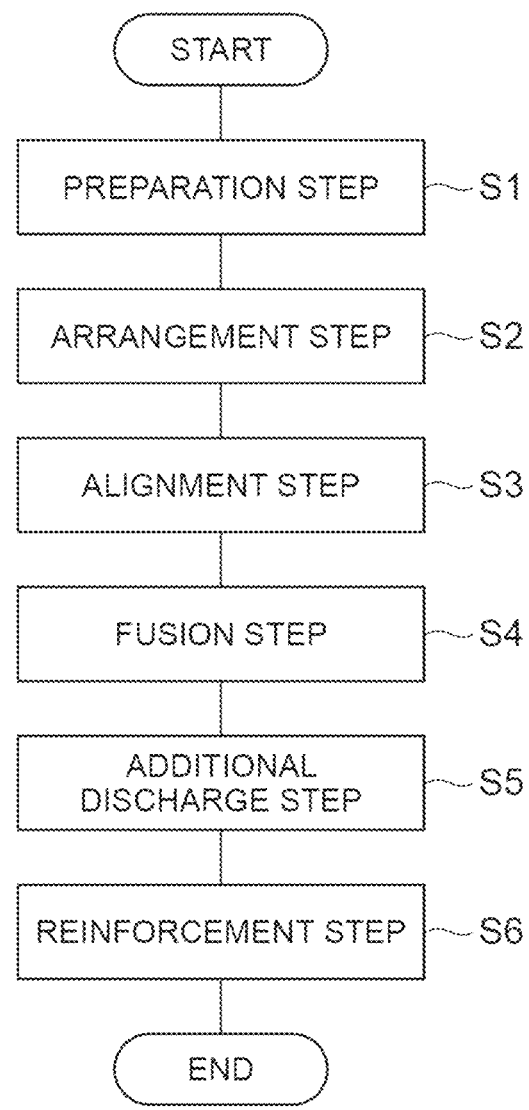
FIG. 6 is a flowchart for describing a method for manufacturing an optical fiber line.

FIG. 6 is a flowchart of the method for manufacturing the optical fiber line. The method for manufacturing the optical fiber line illustrated in FIG. 6 is a method of splicing the end portion of the HNLF corresponding to the HNLF 20 of the present disclosure to the end portion of the SMF corresponding to each of the SMF 11 and the SMF 12. Preparation step S1, arrangement step S2, alignment step S3, fusion step S4, additional discharge step S5, and reinforcement step S6 are performed in this order. The end portions of the HNLF and the SMFs are also spliced at the fusion point 31 and the fusion point 32 illustrated in Configuration 2 (after fusion) of FIG. 1 by this method for manufacturing the optical fiber line.

In preparation step S1, after a part of each coating resin layer is removed in a certain range including the end portions of the prepared SMF and HNLF, the end portions of the SMF and the HNLF are cut by using a fiber cleaver. A cut angle of an end surface is preferably 1.0° or less, more preferably 0.5° or less.

In arrangement step S2, the end portions of the SMF and the HNLF are arranged in an arc discharge type fusion machine in a state in which the cut end surfaces face each other.

In alignment step S3, the SMF and the HNLF are aligned by an alignment function of the arc discharge type fusion machine. In this alignment operation, in order to prevent the splicing loss caused by a displacement between the core of the SMF and the core of the HNLF from increasing at a splicing portion, core alignment due to core position estimation using image processing or power meter alignment that adopts a power meter is performed.

In fusion step S4, the end portions of the SMF and the HNLF are melted by heating in a state of matching each other by arc discharge in the arc discharge type fusion machine. As a result, matching portions are integrated. Hereinafter, the arc discharge power at this time is referred to as a main discharge power.

In additional discharge step S5, a certain range (a region of the region TP illustrated in Structure 0 of FIG. 2 close to the HNLF 20) along the fiber longitudinal direction including the splicing point of the SMF and the HNLF (corresponding to the fusion point 31 (32) illustrated in Structure 0 of FIG. 2) is further heated by discharge by arc discharge in the arc discharge type fusion machine. Note that, it is preferable that the length of the region to be heated along the fiber longitudinal direction is 1 times or more than the outer diameter of the cladding in the HNLF. When heating due to this discharge is performed, in order to confirm a change in the splicing loss based on an optical power measurement value using the power meter, a light source is optically connected to one end of the optical fiber line including the SMF and the HNLF that are already integrated in advance, and the power meter is optically connected to the other end of the optical fiber line. Additional discharge is performed multiple times for a certain time, and the additional discharge is repeated until the change in the splicing loss at a wavelength of 1,550 nm before and after one additional discharge becomes 0.01 dB or less (preferably 0.005 dB or less). When the change in the splicing loss before and after one additional discharge becomes 0.01 dB or less (preferably 0.005 dB or less), it is determined that the splicing loss is minimized, and additional discharge step S5 is ended. The arc discharge power at this time is referred to as an additional discharge power.

In reinforcement step S6, the glass in the region including the fusion points of the SMFs and the HNLF is coated (recoated) with the recoating resin 300 as illustrated in Structure 1 of FIG. 2, and is housed in the reinforcing sleeve 400. By this reinforcement step S6, the obtained optical fiber line can have a strength to withstand a tension of 200 kpsi or more over the entire fiber length.

Figure 8:
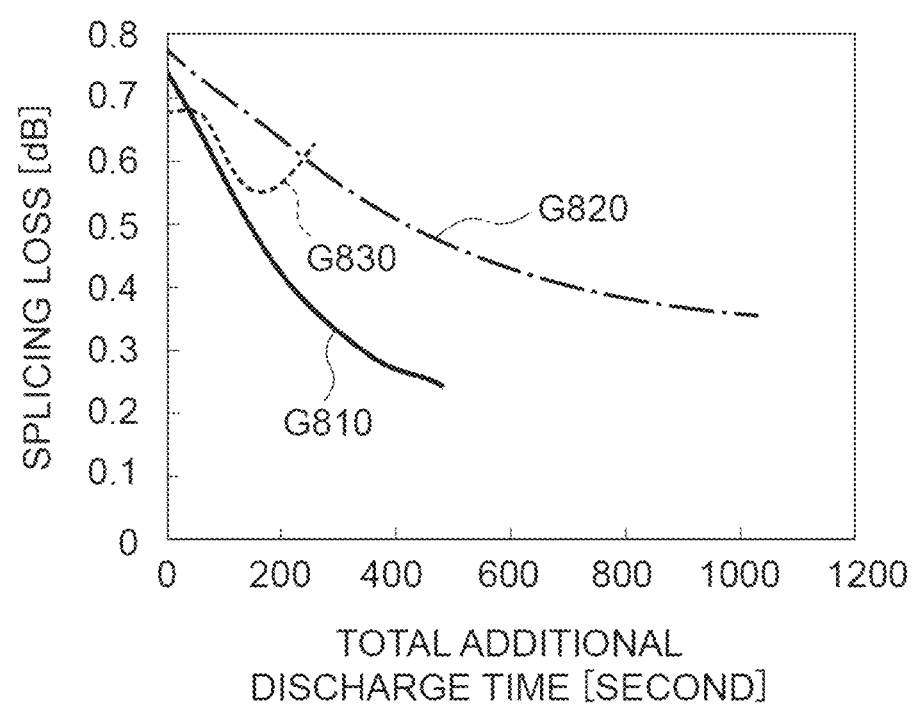
FIG. 8 is a graph showing a relationship between a total additional discharge time in an additional discharge step and a splicing loss per splicing point for the sample of the present disclosure and each of the optical fiber lines of Comparative Example 2 and Comparative Example 3.

FIG. 7 is a table that summarizes a manufacturing condition and a splicing loss of an optical fiber line related to a sample of the present disclosure and a manufacturing condition and a splicing loss of each of optical fiber lines according to Comparative Examples 1 to 3. Further, FIG. 8 is a graph showing a relationship between a total additional discharge time in the additional discharge step and a splicing loss per splicing point for the sample of the present disclosure and each of the optical fiber lines of Comparative Example 2 and Comparative Example 3. Note that, in FIG. 8, a graph G810 shows a discharge-loss relationship in the sample of the present disclosure, a graph G820 shows a discharge-loss relationship in Comparative Example 2, and a graph G830 shows a discharge-loss relationship in Comparative Example 3.

In manufacturing Comparative Example 1, the additional discharge step is not performed, and up to the fiber splicing in the fusion step is performed. In Comparative Example 1, the splicing loss per fusion point at a wavelength of 1,550 nm immediately after the fusion step is 0.75 dB. This splicing loss is smaller than the ideal butting loss of 2.1 dB calculated from the MFD mismatching of the stationary portion SP, but it cannot be said that this splicing loss is sufficiently small for practical use.

In manufacturing Comparative Example 2, up to the fusion step is performed under the same condition as that in Comparative Example 1, and the additional discharge step is further performed. The additional discharge power in the additional discharge step is 50% of the main discharge power in the fusion step. In Comparative Example 2 (graph G820 of FIG. 8), the splicing loss per splicing point at a wavelength of 1,550 nm immediately after the fusion step is 0.77 dB. In the additional discharge step, the splicing loss per splicing point at a wavelength of 1,550 nm is 0.36 dB (minimum value) in a total additional discharge time of 1,000 seconds. It is found that the splicing loss is reduced to half or less than the splicing loss immediately after the fusion step by performing the additional discharge step. Here, the total additional discharge time required to reduce the splicing loss to one-fifth or less than the ideal butting loss calculated from the MFD mismatching of the stationary portion is 580 seconds. Note that, the manufacturing conditions and evaluations of Comparative Example 3 and the sample of the present disclosure will be described later.

Since a maximum temperature in dopant diffusion due to flame heating is lower than that in heating due to discharge, heating for about 30 minutes per splicing point is necessary. In manufacturing Comparative Example 2, the splicing loss is reduced to one-fifth or less than the ideal butting loss calculated from the MFD mismatching of the stationary portion by the dopant diffusion due to discharge heating for 10 minutes or less. Further, in the dopant diffusion due to flame heating, it is necessary to transfer the fiber to a dopant diffusion device due to flame heating after the fusion step using the arc discharge type fusion machine. In contrast, the dopant diffusion due to discharge heating has an advantage that the fusion step and the additional discharge step can be continuously performed by the arc discharge type fusion machine, and can contribute to productivity improvement.

Here, when the total additional discharge time can be further shortened, productivity can be further improved. Further, when the splicing loss is high, it is necessary to increase an input light power required to obtain the same output light from the HNLF module (Configuration 2 of FIG. 1) as much as the increased splicing loss, and reliability of the seed light source of the HNLF module deteriorates. Thus, when the splicing loss can be further reduced, reliability of a device equipped with the HNLF module can be further improved.

From the above-described consideration, the manufacturing condition for achieving a lower splicing loss in a shorter total additional discharge time as compared with the manufacturing of Comparative Example 2 is examined. First, the change in the MFD along the fiber longitudinal direction is investigated for the optical fiber lines according to Comparative Example 1 and Comparative Example 2. In this investigation, the refractive index profile is non-destructively measured by interferometry at each position along the longitudinal direction of the optical fiber line. Subsequently, the MFD is calculated by obtaining a field distribution of a fundamental waveguide mode from the measured refractive index profile by finite element method calculation.

Figure 9:
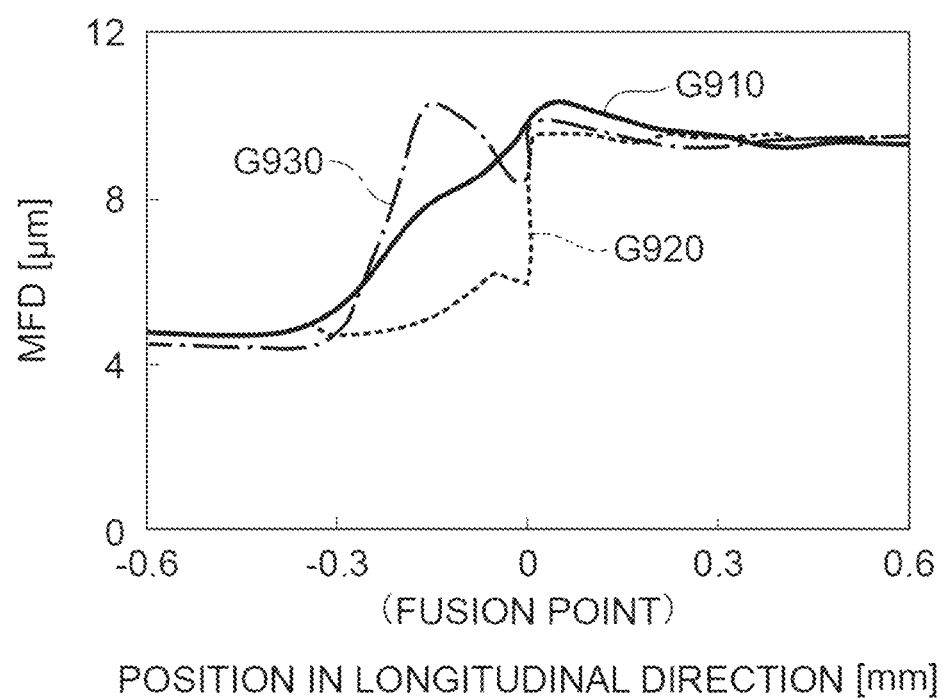
FIG. 9 is a graph showing a change in an MFD along a fiber longitudinal direction (longitudinal direction of the optical fiber line) for the sample of the present disclosure and each of the optical fiber lines of Comparative Example 1 and Comparative Example 2.

FIG. 9 is a graph showing the change in the MFD along the fiber longitudinal direction (longitudinal direction of the optical fiber line) for the sample of the present disclosure and each of the optical fiber lines of Comparative Example 1 and Comparative Example 2. Note that, in FIG. 9, a graph G910 shows the change in the MFD in the sample of the present disclosure, a graph G920 shows the change in the MFD in Comparative Example 1, and a graph G930 shows the change in the MFD in Comparative Example 2. As a position in the longitudinal direction, a position of 0 mm is set to a location (that is, the fusion point) at which optical characteristics and composition of the optical fiber are considered to change discontinuously. A negative region of a position of the longitudinal direction corresponds to the end portion on the HNLF side, and a positive region corresponds to the end portion on the SMF side. In splicing the optical fibers having different MFDs, it is desirable that an MFD transition portion that realizes an MFD taper in which the MFD is gradually enlarged from the optical fiber having a small MFD to the optical fiber side having a large MFD is formed.

In Comparative Example 1 (Graph G920), the MFD is enlarged from 4.8 µm to 6.3 µm in a section from −0.2 mm to −0.05 mm. An ideal butting loss calculated from this enlarged MFD is 0.8 dB, and roughly coincides with the splicing loss in Comparative Example 1. That is, it is considered that the optical fibers are spliced with a splicing loss smaller than 2.1 dB of the ideal butting loss calculated from the MFD mismatching of the stationary portion by the MFD transition portion that realizes the MFD taper. However, the MFD taper is not formed enough to eliminate the MFD mismatching.

In Comparative Example 2 (Graph G930), it is found that the MFD is enlarged in a section from −0.3 mm to −0.15 mm, but the MFD decreases in a section from −0.15 mm to 0 mm, and the MFD transition portion (state in which the MFD does not monotonically change along the fiber longitudinal direction) in which the MFD taper deforms is formed. Accordingly, it is presumed that when the MFD transition portion is formed such that the MFD taper is not deformed, the total additional discharge time can be shortened and the splicing loss can be further reduced.

In the sample of the present disclosure (graph G910), the MFD is enlarged even in a section from −0.05 mm (=−50 µm) to 0 mm (fusion point) unlike the above-mentioned Comparative Example 1. Furthermore, in the sample of the present disclosure, the MFD is enlarged in a section from −0.3 mm (=−300 µm) to 0 mm. As described above, according to the disclosed sample, the MFD at the use wavelength increases monotonically from the second surface to the first surface at least in the region interposed between the first surface (fused end surface) of the end portion of the sample (HNLF) positioned at the fusion point and the second surface separated from the first surface by 50 µm or more and 300 µm or less. Note that, the MFD transition portion (the region coinciding with the region TP in Structure 0 of FIG. 2) includes the above-described region interposed between the first surface and the second surface, and is set over the end portion of the HNLF and the end portion of the SMF with the fusion point of the HNLF and the SMF interposed therebetween. Thus, the total length of the MFD transition portion along the fiber longitudinal direction is 10 mm or less, preferably 2 mm or less. In particular, it is preferable that the length of the portion of the MFD transition portion constituting a part of the HNLF which is defined along the fiber longitudinal direction is 1.5 mm or less in the configuration in which the total length of the MFD transition portion is 2 mm or less.

Figure 10:
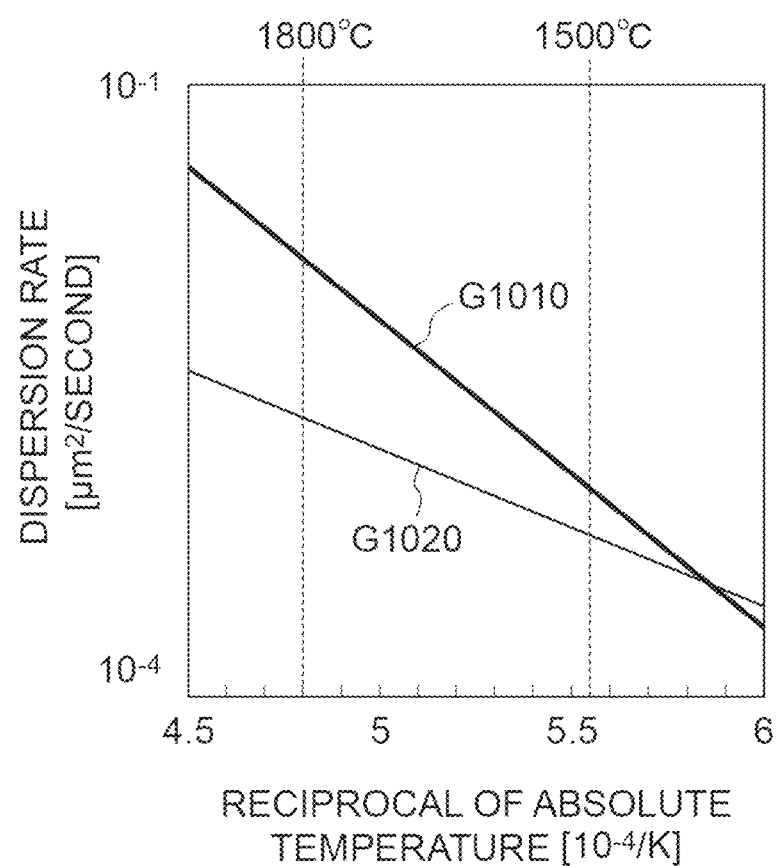
FIG. 10 is a diagram illustrating temperature dependence of diffusion rates of $GeO_2$ and F which are typical dopant substances.

In order to investigate the cause of the formation of the MFD transition portion in which the MFD taper is deformed in Comparative Example 2, the changes in the refractive index profiles of the HNLF and the change in the MFD are calculated in consideration of diffusion of dopant due to heat. In general, diffusion rates of dopant substances added to the optical fiber depend on a temperature. FIG. 10 is a diagram illustrating temperature dependence of diffusion rates of $GeO_2$ and F which are typical dopant substances. Note that, in FIG. 10, a graph G1010 shows the temperature dependence of the diffusion rate of F, and a graph G1020 shows the temperature dependence of the diffusion rate of $GeO_2$. In the HNLF having the W-type refractive index profile illustrated in FIG. 3, the core contains $GeO_2$ and the depressed portion contains F. Since the diffusion rates of these dopant substances are different from each other, a change in the refractive index profile with respect to a heating time differs depending on a heating temperature.

Figure 11:
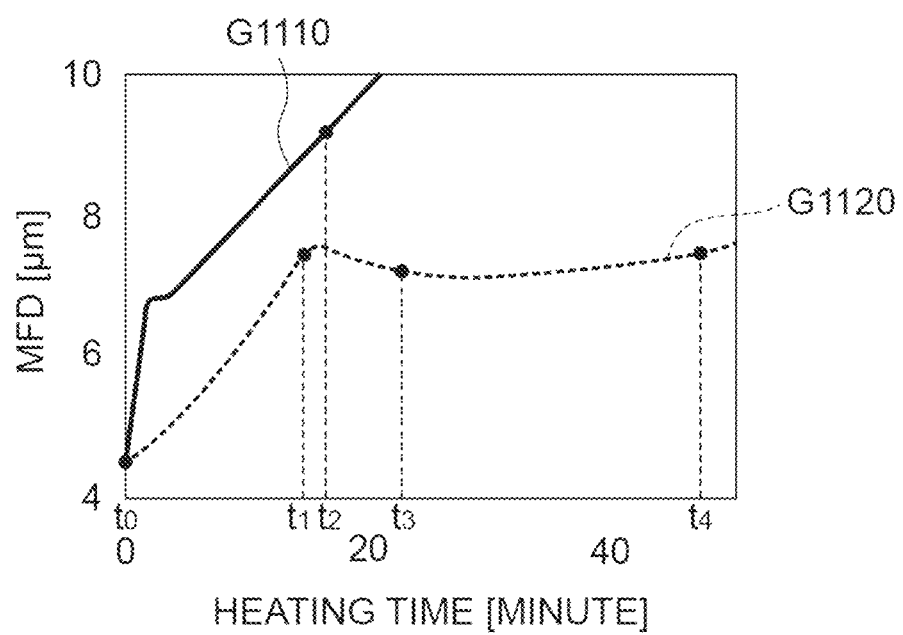
FIG. 11 is a graph illustrating a relationship between a heating time and the MFD of the HNLF when it is assumed that a diffusion rate ratio ($v_F/v_G$) is 20 or 30.
Figure 12:
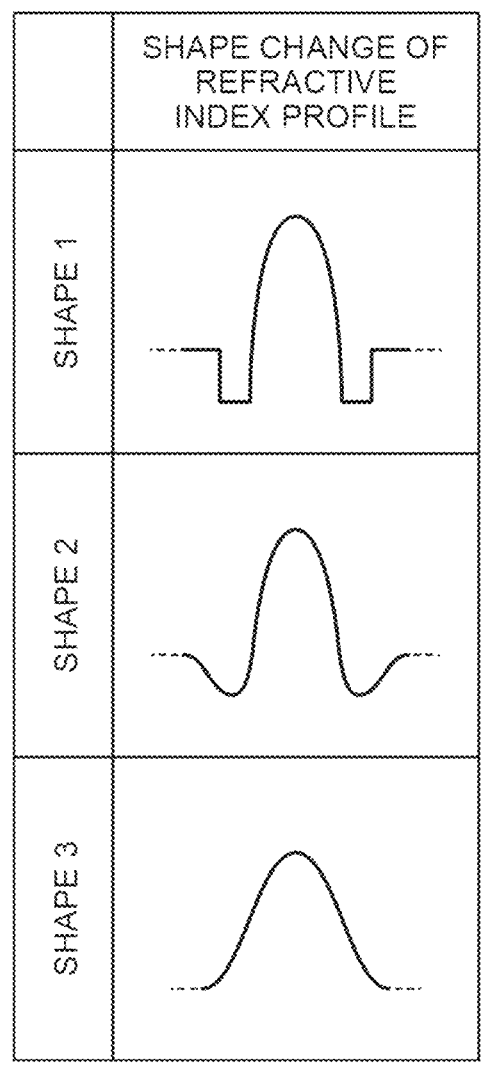
FIG. 12 is a diagram for describing shape changes of a refractive index profile of the HNLF in heated states illustrated by graphs G1110 and G1120 of FIG. 11.

It is assumed that the diffusion rate of F is $v_F$ and the diffusion rate of $GeO_2$ is $v_G$. FIG. 11 is a graph showing a relationship between the heating time and the MFD of the HNLF when it is assumed that a diffusion rate ratio ($v_F/v_G$) is 20 or 30. Further, FIG. 12 is a diagram for describing shape changes of the refractive index profile of the HNLF in heated states shown by graphs G1110 and G1120 of FIG. 11. Note that, in FIG. 11, the graph G1110 shows the relationship at the diffusion rate ratio ($v_F/v_G$)=30, and the graph G1120 shows the relationship at the diffusion rate ratio ($v_F/v_G$)=20. Further, it is considered that a case where the diffusion rate ratio ($v_F/v_G$)=30 corresponds to a heating temperature of 1,800° C. and a case where the diffusion rate ratio ($v_F/v_G$)=20 corresponds to a heating temperature of 1,500° C. Shape 1 illustrated in FIG. 12 illustrates a shape of the refractive index profile of the HNLF 20 at time $t_0$ of both the graph G1110 and the graph G1120 of FIG. 11, Shape 2 illustrated in FIG. 12 illustrates a shape of the refractive index profile of the HNLF 20 in a time from time $t_1$ to time $t_3$ of the graph G1120 of FIG. 11, and Shape 3 illustrated in FIG. 12 illustrates a shape of the refractive index profile of the HNLF 20 at both time t2 of the graph G1110 and time $t_4$ of the graph G1120 of FIG. 11.

As illustrated in FIG. 12, when the HNLF originally having the W-type refractive index profile (Shape 1) is heated, $GeO_2$ contained in the core is dispersed toward the depressed portion, while F contained in the depressed portion is dispersed toward the core and the cladding. Due to the diffusion of such dopant substances, the HNLF eventually has a single-peak refractive index profile (Shape 3).

In the case of the diffusion rate ratio $(v_F/v_G)=20$ (that is, when the heating temperature is 1,500° C.) illustrated in the graph G1120, the diffusion of F is dominant in the W-type refractive index profile (Shape 1 of FIG. 12) at an initial stage (early time zone) of the heating time. This is because the diffusion rate $v_F$ of F is faster than the diffusion rate $v_G$ of $GeO_2$. After the diffusion of F is ended and the single-peak refractive index profile (Shape 3 in FIG. 12) is obtained, the diffusion of $GeO_2$ becomes dominant. In the case of the diffusion rate ratio $(v_F/v_G)=20$, during the transition from the W-type refractive index profile to the single-peak refractive index profile, that is, when the heating time exceeds 15 minutes, the MFD reaches a maximum value of 7.5 µm (the refractive index profile is deformed like Shape 2 of FIG. 12), and then there is a time region in which the MFD decreases with the passage of the heating time. This is the cause of the formation of the MFD transition portion in which the MFD taper is deformed.

As one of methods for avoiding the deformation of the MFD taper, it is considered that an F concentration of the depressed portion is increased, and thus, the maximum value of the MFD is increased by extending a time at which the diffusion of F is ended. However, a value of dispersion which is one of important optical characteristics of the HNLF changes by the refractive index profile of the optical fiber. Since a change in the F concentration of the depressed portion leads to a change in $\Delta_{dep}$, the F concentration is restricted. That is, the deformation of the MFD taper needs to be avoided by controlling the diffusion of the limited F contained in the depressed portion.

On the other hand, in the case of the diffusion rate ratio $(v_F/v_G)=30$ (that is, in the case of the heating temperature of 1,800° C.), it is found that a transition time from the W-type refractive index profile to the single-peak refractive index profile can be shortened, and thus, the MFD can increase monotonically with the passage of heating time. That is, it is considered that the deformation of the MFD taper can be avoided by increasing the heating temperature without increasing the F concentration in the depressed portion. Thus, it is clear that a critical value of the diffusion rate ratio $(v_F/v_G)$ capable of avoiding the deformation of the MFD taper is present between 20 and 30, and an appropriate range of the diffusion rate ratio $(v_F/v_G)$ is set to 22 or more and 40 or less in the sample of the present disclosure.

Based on this finding, fusion is performed under the discharge condition performed in the manufacturing of the sample of the present disclosure (see FIGS. 7 and 8). As illustrated in FIG. 7, the fusion step performed in the manufacturing of the sample of the present disclosure is performed under the same condition as that in Comparative Example 1 and Comparative Example 2. Further, the additional discharge power in the additional discharge step performed in the manufacturing of the sample of the present disclosure is 65% of the main discharge power in the fusion step performed in the manufacturing of Comparative Example 1 (power 15% higher than the additional discharge power in the additional discharge step performed in the manufacturing of Comparative Example 2).

As a result, as illustrated in FIG. 8, in the sample (graph G810) of the present disclosure, the splicing loss per splicing point at a wavelength of 1,550 nm immediately after the fusion step is 0.73 dB and is almost the same as that of Comparative Example 2. In the additional discharge step performed in the manufacturing of the sample of the present disclosure, the splicing loss per splicing point at a wavelength of 1,550 nm is 0.24 dB (minimum value) in a total additional discharge time of 500 seconds. In the sample of the present disclosure, the splicing loss is further reduced by 0.12 dB in half the total additional discharge time as compared with Comparative Example 2.

Note that, in the case of the sample of the present disclosure, the total additional discharge time required to reduce the splicing loss to one-fifth or less than the ideal butting loss in dB notation calculated from the MFD mismatching of the stationary portion in each of the SMF and the HNLF is 200 seconds. An F area concentration added to the depressed portion of the HNLF according to the sample of the present disclosure is $1.6 \times 10^6$ ppm·µm$^2$. A range of the F area concentration is preferably $0.4 \times 10^6$ ppm·µm$^2$ or more and $3.2 \times 10^6$ ppm·µm$^2$ or less, and more preferably $0.8 \times 10^6$ ppm·µm$^2$ or more and $2.4 \times 10^6$ ppm µm$^2$ or less.

The MFD change of the MFD transition portion (the region formed in the region TP in the structure 0 of FIG. 2) of the optical fiber line according to the sample of the present disclosure in the fiber longitudinal direction is investigated in the same manner as in the case of Comparative Example 1. The result is illustrated in FIG. 9. Compared with Comparative Example 1, the sample of the present disclosure has the MFD taper in which the MFD monotonically increases from the position of −0.3 mm to the position of 0 mm. Accordingly, it is necessary to perform the reheating in the additional discharge step performed in the manufacturing of the sample of the present disclosure with at least the discharge power that disperses F (fluorine) contained in the HNLF without melting the cladding of the HNLF for 50 seconds.

On the other hand, in the manufacturing of Comparative Example 3, as illustrated in FIG. 7, the additional discharge power is set higher than that of the sample of the present disclosure, and the additional discharge power is 75% of the main discharge power in Comparative Example 1. In the fusion step performed in the manufacturing of Comparative Example 3, the manufacturing condition is the same for all Comparative Example 1, Comparative Example 2, and the sample of the present disclosure. As a result, as illustrated in FIG. 8, in Comparative Example 3 (Graph G830), the splicing loss became 0.56 dB (minimum value) in the total additional discharge time of 200 seconds, and then the splicing loss increases. This is because when the additional discharge power is set too high, the optical fiber is heated to a temperature at which the optical fiber is deformed in the heated region of the optical fiber during the additional discharge, and as a result, it becomes difficult to reduce the splicing loss. That is, in the case of Comparative Example 3, the splicing loss cannot be reduced to one-fifth or less than the ideal butting loss calculated from the MFD mismatching of the stationary portion.

Figure 13:
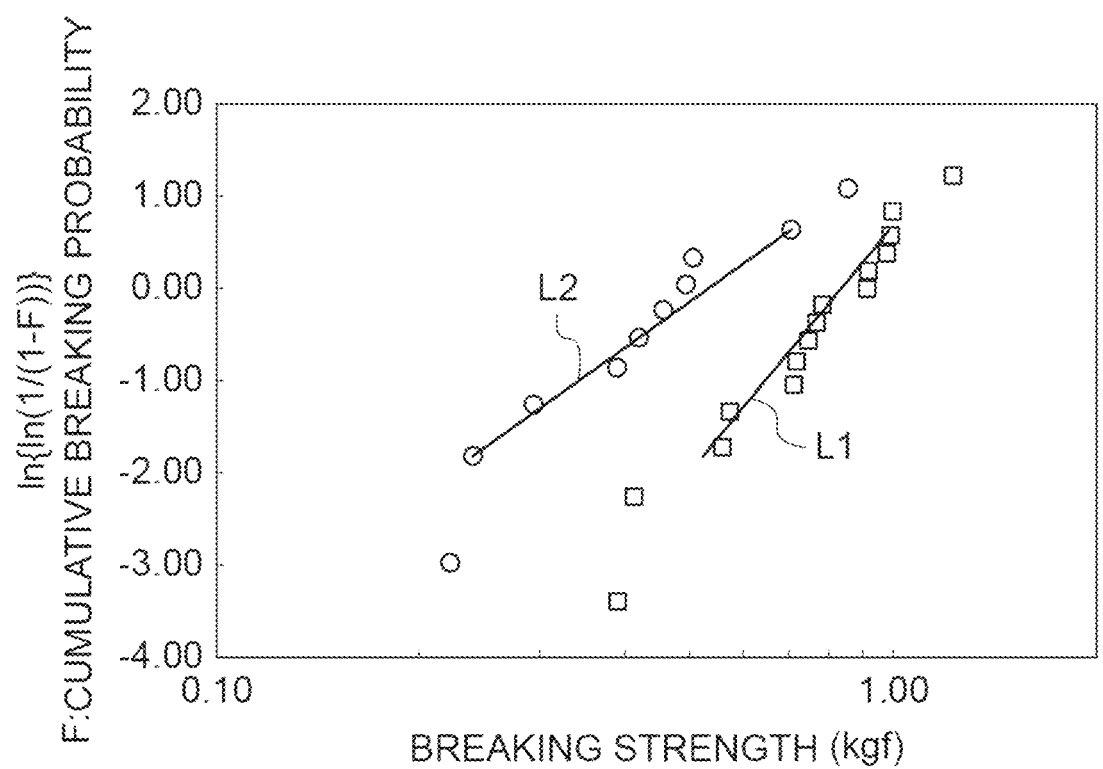
FIG. 13 is a diagram illustrating, as a Weibull distribution plot, results obtained by evaluating mechanical strength characteristics of the sample of the present disclosure and the optical fiber line of Comparative Example 2.

A high breaking strength of a fused portion can be one factor for ensuring long-term reliability of the module. FIG. 13 illustrates, as a Weibull distribution plot, results obtained by evaluating mechanical strength characteristics of the sample of the present disclosure and the optical fiber line of Comparative Example 2 (results of a tensile strength test on fused portions of the sample of the present disclosure and Comparative Example 2). In FIG. 13, a symbol "□" indicates an evaluation result for the sample of the present disclosure, and a symbol "○" indicates an evaluation result for Comparative Example 2. A straight line L1 is an approximate straight line of the evaluation result for the sample of the present disclosure obtained by a least squares method, and a straight line L2 is an approximate straight line of the evaluation result for the Comparative Example 2. Slopes of the straight line L1 and the straight line L2 indicate variations of the evaluation results, and as the slopes become larger, the variations of the evaluation results become small.

As can be seen from FIG. 13, in the sample of the present disclosure, a 50% breaking strength (breaking strength at a cumulative breaking probability F=0.5) is 7.5 N (0.77 kgf). On the other hand, in the case of Comparative Example 2, the 50% breaking strength is 4.5 N (0.46 kgf). Accordingly, the 50% breaking strength in the tensile strength test is preferably 4.5 N or more. It is considered that a high breaking strength can be realized in the manufacturing of the sample of the present disclosure since the total additional discharge time can be shortened as compared with the case of manufacturing Comparative Example 2. That is, the optical fiber line according to the sample of the present disclosure can achieve both a low splicing loss and a high breaking strength.

REFERENCE SIGNS LIST 10, 11, 12 . . . Single mode optical fiber (SMF); 20 . . . Highly non-linear optical fiber (HNLF); 31, 32 . . . Fusion point (fusion end surface); 50 . . . Metal housing; 101, 201 . . . Core; 202 . . . Depressed portion; 102, 203 . . . Cladding; 103, 204 . . . Coating resin layer; 300 . . . Recoating resin; 400 . . . Reinforcing sleeve; TP . . . MFD taper forming region (coinciding with MFD transition portion); and SP . . . Stationary portion.

The invention claimed is:

1. An optical fiber line comprising:
a highly non-linear optical fiber including a core, a depressed portion surrounding the core and having a refractive index lower than a refractive index of the core, and a cladding surrounding the depressed portion and having a refractive index lower than the refractive index of the core and higher than the refractive index of the depressed portion;
a single mode optical fiber fusion-spliced to the highly non-linear optical fiber and having a core and a cladding surrounding the core and having a refractive index lower than a refractive index of the core; and
a mode field diameter (MFD) transition portion constituted by end portions of both the highly non-linear optical fiber and the single mode optical fiber which butt to each other with a fusion point of the highly non-linear optical fiber and the single mode optical fiber interposed therebetween, the MFD transition portion being defined as a section in which a mode field diameter at a use wavelength of 1550 nm changes such that a difference between a maximum value for 100 μm which is a distance along a fiber longitudinal direction of the MFD transition portion and a minimum value for the 100 μm-distance along the fiber longitudinal direction of the MFD transition portion is 0.3 μm or more,
wherein a splicing loss of the highly non-linear optical fiber and the single mode optical fiber at a wavelength of 1,550 nm is one-fifth or less than an ideal butting loss, the ideal butting loss being calculated based on mismatching between mode field diameters of both the highly non-linear optical fiber and the single mode optical fiber at stationary portions excluding the MFD transition portion at a wavelength of 1,550 nm,
a total length of the MFD transition portion which is defined along the fiber longitudinal direction of the MFD transition portion is 10 mm or less,
a mode field diameter at the use wavelength increases monotonically to a first surface of the end portion of the highly non-linear optical fiber positioned at the fusion point from a second surface separated from the first surface by 50 μm or more and 300 μm or less in a region interposed between the first surface and the second surface, and
in the region interposed between the first surface of the end portion of the highly non-linear optical fiber and the second surface separated from the first surface by 50 μm, a ratio ($v_F/v_G$) of a diffusion rate $v_F$ of fluorine to a diffusion rate $v_G$ of $GeO_2$ is 22 or more and 40 or less.

2. The optical fiber line according to claim 1,
wherein the highly non-linear optical fiber is comprised of silica glass, and
at the stationary portion of the highly non-linear optical fiber, the core is free from a refractive index reducer as a dopant that lowers a glass refractive index at the wavelength of 1,550 nm and contains a refractive index increaser as a dopant that raises the glass refractive index at the wavelength of 1,550 nm, the depressed portion is free from the refractive index increaser and contains the refractive index reducer, and the cladding is free from the refractive index reducer.

3. The optical fiber line according to claim 2,
wherein, at the stationary portion of the highly non-linear optical fiber, the core contains $GeO_2$ as the refractive index increaser, and the depressed portion contains fluorine having an area concentration of $0.4 \times 10^6$ ppm·μm$^2$ or more and $3.2 \times 10^6$ ppm·μm$^2$ or less as the refractive index reducer.

4. The optical fiber line according to claim 1,
wherein, at the end portion of the highly non-linear optical fiber, an outer diameter of the cladding of the highly non-linear optical fiber decreases or increases monotonically from the stationary portion of the highly non-linear optical fiber to the stationary portion of the single mode optical fiber.

5. The optical fiber line according to claim 1,
wherein the total length of the MFD transition portion is 2 mm or less, and
a length of a portion constituting a part of the highly non-linear optical fiber of the MFD transition portion which is defined along the fiber longitudinal direction is 1.5 mm or less.

6. The optical fiber line according to claim 1,
wherein the single mode optical fiber is an optical fiber compliant with G.657.A1 of ITU-T.

7. The optical fiber line according to claim 1,
wherein, at the stationary portion of the highly non-linear optical fiber, an outer diameter of the core is 2.5 μm or more and 4.0 μm or less, an outer diameter ratio of the depressed portion to the core is 1.8 or more and is 3.2 or less, a relative refractive index difference of a maximum refractive index of the core to an average refractive index of the cladding is 1.3% or more and 2.0% or less, and a relative refractive index difference of a minimum refractive index of the depressed portion to the average refractive index of the cladding is −1.0% or more and −0.5% or less, and the stationary portion of the highly non-linear optical fiber has an effective area of 10 μm² or more and 30 μm² or less at the wavelength of 1,550 nm, the mode field diameter of 3.5 μm or more and 5.0 μm or less at the wavelength of 1,550 nm, a chromatic dispersion of −3.0 ps·km⁻¹·nm⁻¹ or more and 1.5 ps·km⁻¹·nm⁻¹ or less at the wavelength of 1,550 nm, and a non-linear coefficient of 7 $W^{-1}·km^{-1}$ or more and 20 $W^{-1}·km^{-1}$ or less at the wavelength of 1,550 nm.

8. The optical fiber line according to claim 1, wherein a butting region constituted by the end portion of the highly non-linear optical fiber and the end portion of the single mode optical fiber and including the fusion point, is protected by being coated with resin or housed in a reinforcing sleeve, and the butting region protected by the resin or the reinforcing sleeve has a strength of 200 kpsi or more.

9. The optical fiber line according to claim 1, wherein both the highly non-linear optical fiber and the single mode optical fiber have a coating resin layer surrounding the cladding and containing a colorant, and the coating resin layers of the highly non-linear optical fiber and the single mode optical fiber include colorants of different colors, respectively.

10. The optical fiber line according to claim 1, wherein a 50% breaking strength in a tensile strength test is 4.5 N or more.

11. A module comprising:

the optical fiber line according to claim 1; and a metal housing configured to house the optical fiber line.

* * * * *